United States Patent
Feldkamp

(10) Patent No.: US 7,041,160 B2
(45) Date of Patent: May 9, 2006

(54) SOLUBILITY ADDITIVE FOR INK COMPOSITIONS

(75) Inventor: Joseph Raymond Feldkamp, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 111 days.

(21) Appl. No.: 10/736,456

(22) Filed: Dec. 15, 2003

(65) Prior Publication Data

US 2005/0126434 A1 Jun. 16, 2005

(51) Int. Cl.
*C09D 11/00* (2006.01)
*B41J 2/01* (2006.01)

(52) U.S. Cl. .................... 106/31.43; 347/100
(58) Field of Classification Search ............. 106/31.43, 106/31.27, 31.34; 347/100
See application file for complete search history.

(56) References Cited

U.S. PATENT DOCUMENTS

| | | | |
|---|---|---|---|
| 5,106,416 A | | 4/1992 | Moffatt et al. |
| 5,507,865 A | | 4/1996 | Yoshida et al. |
| 6,306,204 B1 | | 10/2001 | Lin |
| 6,565,642 B1 | | 5/2003 | Taniguchi et al. |
| 6,572,690 B1 | | 6/2003 | Rehman et al. |
| 2004/0134381 A1* | | 7/2004 | Taguchi et al. ......... 106/31.43 |
| 2004/0261658 A1* | | 12/2004 | Rehman ................. 106/31.43 |

FOREIGN PATENT DOCUMENTS

| | | | |
|---|---|---|---|
| EP | 000659852 A1 * | 6/1995 | |
| JP | 08-302253 | * | 11/1996 |
| JP | 2001-139854 | * | 5/2001 |

OTHER PUBLICATIONS

Abstract of JP 08-302253 from Patent Abstracts of Japan, Nov. 1996.*
Abstract of JP 2001-139854 from Patent Abstracts of Japan; May 2001.*
Article—*Partitioning Of Binary Solvents On Charged Expandable Clays*, Joseph R. Feldkamp and Thomas B. Stauffer, Clays and Clay Minerals, vol. 44, No. 6, 1996, pp. 727-733, no month.
Article—*Interactions of Binary Solvents with Charged Expandable Clays. 1. Theory*, Joseph R. Feldkamp and Thomas B. Stauffer, The Journal of Physical Chemistry, vol. 98, No. 51, 1994, pp. 13594-13600, no month.
Article—*Interactions of Binary Solvents with Charged Expandable Clays. 2. Experiment*, Joseph R. Feldkamp and Thomas B. Stauffer, The Journal of Physical Chemistry, vol. 98, No. 51, 1994, pp. 13601-13606, no month.
Paper—*Use Of High Dipole Moment Small Molecules To Enhance Swelling Of Ionic Hydrogels*, J. R. Feldkamp, TR 2453, Sep. 18, 2001, 17 pages.
Abstract of Japanese Patent No. 561335568, Oct. 23, 1981.
PCT Search Report and Written Opinion for PCT/US2004/020282, Sep. 16, 2004.

* cited by examiner

Primary Examiner—Helene Klemanski
(74) *Attorney, Agent, or Firm*—Dority & Manning, P.A.

(57) ABSTRACT

An additive for improving the solubility of dyes in a dye composition is disclosed. The additive is a zwitterion that has a polarity greater than the polarity of a solvent in which the dye is dispersed or solubilized. In one embodiment, the additive comprises an amino acid or a derivative of an amino acid. Dye compositions formulated according to the present invention are particularly well suited for use in ink-jet printers.

34 Claims, No Drawings

SOLUBILITY ADDITIVE FOR INK COMPOSITIONS

BACKGROUND OF THE INVENTION

The ink-jet printing process involves the ejection of fine droplets of an ink composition onto a print medium such as paper in response to electric signals generated by a controller, such as a microprocessor. The fine droplets are typically emitted by a printing head that passes over the print medium without contacting the print medium.

The printing head, in some embodiments, may include an orifice plate that has very small nozzles through which the ink droplets are ejected. The nozzles can be, for instance, less than 50 microns in diameter. The nozzles are in fluid communication with the ink composition. Ink drop ejection is currently achieved either thermally or piezoelectrically. In thermal ink-jet printing, each nozzle is associated with a resistor element. Each resistor element is in turn connected to a microprocessor, whose signals direct one or more resistor elements to heat up rapidly. This causes a rapid expansion of ink that forces a drop of ink through the associated nozzle onto the print medium.

In piezoelectric ink-jet printing, ink droplets are ejected due to the vibrations of piezoelectric crystals stimulated by electrical signals generated by a microprocessor.

Many ink-jet ink compositions contain a dye dissolved in a solvent. The dye is typically anionic. For instance, sulfonated dyes are widely used in ink-jet applications. Of particular advantage, these dyes may be dissolved or dispersed in an aqueous-based system.

Unfortunately, however, many ink-jet inks are susceptible to dye aggregation. Dye aggregation may be especially prominent when using higher molecular weight dyes, such as those having molecular weights approaching 1,000 g/mol. Dye aggregation can also occur if the dye composition contains background salts and other impurities which may be left over fragments from commercial dye synthesis. The formation of dye aggregates can cause the dye to coalesce and form much larger clusters which lead to nozzle fouling. Once nozzle fouling occurs, the precision of the ink-jet printer becomes compromised. In fact, clogging of the nozzle can lead to the complete breakdown of the printer.

As such, a need currently exists for a solubility additive which inhibits dyes from coalescing in dye compositions and therefore leads to higher dye solubility.

In particular, a need exists for an additive that hinders the flocculation of dye aggregates into macro-particles in order to prevent the nozzles of a printing head from fouling.

SUMMARY OF THE INVENTION

In general, the present invention is directed to an improved stabilized ink composition. The ink composition may be, for instance, designed for use with an ink-jet printer. In one embodiment, the ink composition includes a dye, a solvent for the dye, and an additive comprising an amino acid or a derivative of an amino acid. The amino acid additive has been found to prevent the dye from coalescing in the solvent and fouling up a printer in which the dye composition is used. In particular, the additive has a polarity greater than the polarity of the solvent. Ultimately, the amino acid additive can increase the solubility of the dye in the solvent.

The amino acid additive may be a zwitterion. Examples of particular amino acids that may be used in the present invention include glycine, lysine, taurine, beta-alanine, betaine, or mixtures thereof. In one embodiment, the additive may comprise a sulfonic acid analog of an amino acid. The amino acid additive may have a dipole moment of greater than about 4 debye, such as greater than about 10 debye.

In one embodiment, the solvent contained within the dye composition is water. The dye, on the other hand, may be a sulfonated dye or an acid dye. The dye composition may also contain various other ingredients, such as an organic cosolvent and/or a surfactant.

The additive may be contained in the dye composition in an amount sufficient to prevent the dye from coagulating. For example, in one embodiment, the additive may be present in the dye composition at a mole fraction of greater than about 0.001, such as greater than about 0.004. In one particular embodiment, the additive may be present in the composition at a mole fraction of from about 0.004 to about 0.04, such as from about 0.01 to about 0.02.

In one embodiment of a process in accordance with the present invention, the above dye composition is printed onto a substrate using an ink-jet printer. The ink-jet printer may, for instance, include a print head that emits small droplets of the dye composition that are directed onto the substrate. The ink-jet printer may deposit the droplets onto the substrate without the print head contacting the substrate.

Other features and advantages of the present invention will be made apparent from the following detailed description.

DETAILED DESCRIPTION

The invention will now be described in detail with reference to particular embodiments thereof. The embodiments are provided by way of explanation of the invention, and not meant as a limitation of the invention. For example, features described or illustrated as part of one embodiment may be used with another embodiment to yield still a further embodiment. It is intended that the present invention include these and other modifications and variations as come within the scope and spirit of the invention.

In many dye formulations, the dye within the formulation may have a tendency to form aggregates which may ultimately cause the dye to coalesce. Dye aggregation and coalescing is a particular problem when the dye formulation contains dyes having a high molecular weight. Once coalescing of the dye occurs, problems may be experienced in printing the dye formulations onto a substrate. For instance, should dye aggregates cause coalescing, the dye formulation may easily foul a printer, especially ink-jet printers.

In this regard, the present invention is generally directed to an additive for incorporation into a dye composition which tends to inhibit molecular aggregation of dyes and therefore leads to higher dye solubility. In accordance with the present invention, the additive is a material that forms a zwitterion in the dye composition and is more polar than the solvent into which the dye is dispersed. In one embodiment, for instance, the additive of the present invention comprises an amino acid or a derivative of an amino acid, such as an amino acid analog.

In general, the additive of the present invention may be used in any suitable ink composition. In many embodiments, for instance, the ink composition contains an ink or dye, a solvent for the dye, and various other ingredients. Suitable dyes that may be used with the additive of the present invention include, for instance, acid dyes, and sulfonated dyes including direct dyes. The dyes may be formulated to be used in an aqueous-based composition or in a nonaqueous-based composition.

Particular examples of aqueous dyes that may be used in the present invention include Direct Black 19, Direct Blue 86, Direct Blue 199, Direct Yellow 132, Acid Yellow 132, Direct Red 9, Direct Red 32, Acid Yellow 23, Acid Blue 185, Acid Blue 9, Acid Red 17, Acid Red 52, Acid Red 249, and Reactive Red 180.

Other dyes which may be used include Pigment Yellow 138, Pigment Red 122, Pigment Blue 15:3, toluidine red, Permanent Carmine FB, Fast Yellow AAA, Disazo Orange PMP, Lake Red C, Brilliant Carmine 6B, phthalocyanine blue, quinacridone red, dioxane violet, victoria pure blue, alkali blue toner, Furnace Yellow 10G, Disazo Yellow AAMX, Disazo Yellow AAOT, Disazo Yellow AAOA, yellow iron oxide, Disazo Yellow HR, ortho-nitroaniline orange, dinitroaniline orange, vulcan orange, toluidine red, chlorinated para red, brilliant fast scarlet, Naphthol Red 23, pyrazon red, Barium Red 2B, Calcium Red 2B, Strontium Red 2B, Manganese Red 2B, barium lithol red, Pigment Scarlet 3B Lake, Lake Bordeaux 10B, anthosin lake, Anthosin 5B Lake, Rhodamine 6G Lake, eosin lake, ferric oxide, Naphtol Red FGR, Rhodamin B Lake, methyl violet lake, dioxazine violet, Basic Blue 5B Lake, Basic Blue 6G Lake, fast sky blue, Alkali Blue R Toner, peacock blue lake, iron blue, ultramarine blue, Reflex Blue 2G, Reflex Blue R, brilliant green lake, diamond green thioflavine lake, Phtalocyanine Green G, green gold, Phtalocyanine Green Y, iron oxide powder, rust powder, zinc white, titanium oxide, calcium carbonate, clay, barium sulfate, alumina, alumina white, aluminium powder, bronze powder, daylight fluorescent pigment, pearl pigment, Naphthol Carmine FB, Naphthol Red M, Permanent Carmine FB, Fast Yellow G, Disazo Yellow AAA, dioxane violet, Alkali Blue G Toner, and processed pigments like graft carbon of which its pigment surface is processed with resin.

As stated above, each of the above described dyes may be used in an aqueous-based composition. In alternative embodiments, however, the dyes may be incorporated into a nonaqueous-based composition in which the solvent is an organic compound.

When incorporated into an aqueous-based composition, in addition to water and the dye, the composition can also include an organic cosolvent and one or more surfactants. Optionally, an organic acid may also be contained in the composition.

The organic cosolvents that may be used in the composition are water-soluble. Exemplary water-soluble organic cosolvents include aliphatic alcohols, aromatic alcohols, diols, triols, amides, ketones, polyketones or ketoalcohols, nitrogen-containing heterocyclic ketones, ethers, glycol ethers, poly(glycol) ethers, alkylene glycols, polyalkylene glycols, thioglycols containing alkylene groups, lower alkyl ethers of polyhydric alcohols and lactams.

Particular examples of organic cosolvents include methyl alcohol, ethyl alcohol, n-propyl alcohol, isopropyl alcohol, n-butyl alcohol, sec-butyl alcohol, and tert-butyl alcohol. Amides that may be used include dimethylformamide and dimethylacetamide. Ethers that may be used include tetrahydrofuran and dioxane, while particular glycols include ethylene glycol, propylene glycol, butylene glycol, triethylene glycol, 1,2,6,-hexanetriol, thiodiglycol, hexylene glycol, and diethylene glycol. Lower alkyl ethers of polyhydric alcohols include glycerine, ethylene glycol monomethyl ether, diethylene glycol monomethyl ether, triethylene glycol monomethyl ether, N-methyl-2-pyrrolidone, 2-pyrrolidone, and 1,3-dimethyl-2-imidazolidinone.

Surfactants that may be used in the dye composition include anionic surfactants, cationic surfactants, amphoteric surfactants, non-ionic surfactants, and the like.

As the anionic surfactants, alkylsulfate, polyoxyethylene alkyl ether sulfate, including diphenyl sulfonate derivatives like, but not limited to, sodium hexadecyl diphenyloxide disulfonate, and ethoxylated oleoalcohol phosphate esters and the like can be used. As the cationic surfactants, alkyltrimethylammonium chloride, dialkyldimethylammonium choloride, protonated POE amines and the like can be used.

As the high-molecular weight surfactants, high-molecular weight polyurethane, polyester and the like can be used. As the high-molecular weight polymers, polymers having functional groups which have affinity toward pigments e.g. carbonyl group or/and amino group, can be used.

Non-ionic surfactants include alkyl polyethylene oxides (POEs); alkyl phenyl POEs including polyoxyethylene alkylphenyl ethers; ethylene oxide/propylene oxide block copolymers; acetylenic POEs; POE esters; POE alkyl ethers; POE diesters; POE amines; POE amides; and dimethicone copolyols. Other non-ionic surfactants include polyoxyethylene sorbitan fatty acid ester, polyoxypropylene glycols, and polyoxypropylene alkyl ethers. U.S. Pat. No. 5,106,416 (incorporated by reference herein) discusses many of the surfactants listed above in greater detail.

Amphoteric surfactants such as substituted amine oxides or members of the octyl dimethyl glycine family of octylamine choloroacetic adducts may be used. Other amphoteric surfactants include alkyldimethyl aminoacetic acid betaine, alkyldimethyl amine oxide, alkylcarboxymethylhydroxyethyl imidazolium betaine and the like.

Specific examples of surfactants that may be employed in the practice of this invention include secondary alcohol ethoxylates, SURFYNOL™ CT-11, Octyl dimethyl glycine, sodium hexadecyl diphenyloxide disulfonate, oleyl triethoxy mono diphosphate, isohexadecyl ethylene oxide 20 (available from the ICI Group as ARLASOLVE™ 200), and amine oxides such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide.

In one particular embodiment of the present invention, the ink composition can contain the dye in an amount up to about 15% by weight, such as from about 0.2 to about 10% by weight. The organic cosolvent may be present in an amount up to about 50% by weight, such as from about 5% to about 30% by weight. One or more surfactants may be present in an amount up to about 40% by weight, such as from about 0.1% by weight to about 15% by weight. When present, organic acids may be present in an amount of around 5 to 10% by weight. The remainder of the ink composition comprises water and possibly other ingredients in minor amounts.

In accordance with the present invention, the ink composition further contains an additive that serves to stabilize the composition and prevents the dye contained within the composition from coalescing. The additive in accordance with the present invention may be a zwitterion, possessing both a positive and negative charge simultaneously on opposite ends of the molecule. The present inventor has discovered that by using an additive having a greater polarity than the solvent contained in the dye composition, the additive serves to improve the solubility of the dye and prevent the dye from coalescing. For example, the additive of the present invention may have a dipole moment of greater than about 4 debye, such as greater than about 6 debye. In various embodiments, for instance, the dipole moment of the additive may be greater than about 10 debye, such as greater than about 12 debye, and even greater than about 15 debye. For a point of reference, the dipole moment of water is less than 2 debye. Thus, for most applications, the additive has a greater dipole moment than water.

In order to determine whether or not the additive has a greater polarity than the solvent, in one embodiment, the additive may be added to the solvent while the dielectric constant of the liquid is measured. If the dielectric constant rises after addition of the additive, then the additive may be deemed to have a greater polarity. For instance, the additive may increase the dielectric constant of the liquid by at least 20%, by at least 50%, by at least 75%, or even by greater than 100%.

In one embodiment of the present invention, the additive is an organic zwitterion, such as an amino acid or a derivative of an amino acid. A derivative of an amino acid may include, for instance, a sulfonic or phosphonic acid analog of an amino acid. Amino acid additives used in the present invention generally have a lower molecular weight. For instance, the amino acid additive may have a molecular weight of less than about 500, such as less than about 200 (based on standard atomic weights). The amino acid additive, for many applications, also has relatively small or no side chains on the molecule. For instance, the side chains may have less than about 6 carbon atoms. In one particular embodiment, for instance, the side chains have less carbon atoms than the backbone of the molecule. Particular examples of amino acid additives that may be used in the present invention include glycine, lysine, taurine (which is an analog), beta-alanine, and betaine.

Although it is unknown how the zwitterion additive of the present invention improves the solubility of dyes in a dye composition, it is believed that the additive becomes closely associated with the dye. For instance, dyes typically bear an electrical charge which results in the formation of an electrical double layer surrounding individual molecules or aggregates of the dye. These regions of high electrical field tend to strongly acquire and accumulate higher polarity species present in the solvent space. Thus, a zwitterion in accordance with the present invention, such as an amino acid, is believed to have a strong tendency to preferentially accumulate in the electrical double layer region of the dye due to its much higher dipole moment than the solvent. When present in large concentrations in the immediate vicinity of the dye, the zwitterion additive is believed to confer substantial osmotic activity to the electrical double layer region causing the dye to be surrounded by solvent molecules, such as water.

The amount the zwitterion additive is added to the dye composition depends upon the particular dye formulation and the desired results. In many embodiments, for instance, the additive should be present in the dye composition at a mole fraction of greater than about 0.001, such as greater than about 0.004. For instance, the additive may be present in the dye composition at a mole fraction of from about 0.004 to about 0.04, such as from about 0.01 to about 0.02. The additive can also be present at a mole fraction of less than about 0.1. Adding greater amounts of the additive may not adversely interfere with the dye composition but may not serve to further improve the solubility of the dye.

Dye compositions made in accordance with the present invention can be used in any suitable application. For instance, the dye compositions may be fed to any suitable printer and transferred onto a substrate. In one particular embodiment, for instance, the dye composition may be fed through a non-impact printer, such as an ink-jet printer. Ink-jet printers typically include an ink-jet print head that has a plurality of orifices. A dye composition made according to the present invention may be expelled from one or more of these orifices thus exiting the print head of the ink-jet printer. Drops of the dye composition then travel a throw distance between the print head and the substrate, such as a paper. The orifices of the print head may be aligned in a single row or may be formed having various patterns. The composition may be expelled from these orifices either simultaneously or through selected orifices at any given time.

According to the present invention, any suitable ink-jet printing device can be used for applying dye compositions according to the present invention. Examples of ink-jet printers that may be used with the dye composition include, for instance, thermal inkjet printers, piezoelectric printers, and valve jet printers.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An ink composition comprising:
   a dye;
   a solvent for the dye; and
   an additive comprising a sulfonic acid analog of an amino acid, the additive having a polarity greater than the polarity of the solvent, the additive present in an amount that inhibits the dye from coalescing in the solvent thereby increasing the solubility of the dye in the solvent.

2. An ink composition as defined in claim 1, wherein the amino acid comprises glycine, lysine, taurine, beta-alanine, betaine, or mixtures thereof.

3. An ink composition as defined in claim 1, wherein the sulfonic acid analog of an amino acid is a zwitterion.

4. An ink composition as defined in claim 1, wherein the additive is present in the ink composition at a mole fraction of from about 0.004 to about 0.04.

5. An ink composition as defined in claim 1, wherein the additive is present in the ink composition at a mole fraction of from about 0.01 to about 0.02.

6. An ink composition as defined in claim 1, wherein the solvent comprises water.

7. An ink composition as defined in claim 1, wherein the additive has a dipole moment greater than about 4 debye.

8. An ink composition as defined in claim 1, wherein the additive has a dipole moment greater than about 10 debye.

9. An ink composition as defined in claim 1, wherein the dye comprises a sulfonated dye.

10. An ink composition as defined in claim 1, wherein the dye comprises an acid dye.

11. An ink composition as defined in claim 1, wherein the ink composition further comprises an organic cosolvent and a surfactant.

12. An ink composition as defined in claim 1, wherein the dielectric constant of the composition increases by at least 20% due to the presence of the additive.

13. An ink composition as defined in claim 1, wherein the sulfonic acid analog of an amino acid has a molecular weight of less than about 500.

14. An ink composition comprising:
a dye comprising a sulfonated dye or an acid dye;
a solvent for the dye, the solvent comprising water for forming an aqueous medium; and
an additive comprising a sulfonic acid analog of an amino acid, the amino acid or the derivative of the amino acid being a zwitterion, the additive having a polarity greater than the polarity of water, the additive being present in a concentration that prevents the dye from coalescing in the solvent thereby increasing the solubility of the dye in the solvent.

15. An ink composition as defined in claim 14, wherein the additive is present in the ink composition at a mole fraction greater than about 0.004.

16. An ink composition as defined in claim 14, wherein the additive has a dipole moment greater than about 4 debye.

17. An ink composition as defined in claim 14, wherein the additive has a dipole moment greater than about 10 debye.

18. An ink composition as defined in claim 14, wherein the amino acid comprises glycine, lysine, taurine, beta-alanine, betaine, or mixtures thereof.

19. An ink composition as defined in claim 14, wherein the ink composition further comprises an organic cosolvent and a surfactant.

20. An ink composition as defined in claim 14, wherein the dye comprises a sulfonated dye.

21. An ink composition as defined in claim 14, wherein the dielectric constant of the composition increases by at least 20% due to the presence of the additive.

22. An ink composition as defined in claim 14, wherein the sulfonic acid analog of an amino acid has a molecular weight of less than about 500.

23. A process for printing on a substrate comprising:
ink-jet printing an ink composition onto a substrate, the ink composition comprising:
(a) a dye comprising a sulfonated dye or an acid dye;
(b) a solvent for the dye, the solvent comprising water for forming an aqueous medium; and
(c) an additive comprising a sulfonic acid analog of an amino acid, the amino acid or the derivative of the amino acid being a zwitterion, the additive having a polarity greater than the polarity of water, the additive being present in an amount that prevents the dye from coalescing in the solvent thereby increasing the solubility of the dye in the solvent.

24. A process as defined in claim 23, wherein the ink composition is emitted by a printing head onto the substrate in the form of droplets, the printing head not contacting the substrate during the printing process.

25. A process as defined in claim 23, wherein the amino acid comprises glycine, lysine, taurine, beta-alanine, betaine, or mixtures thereof.

26. A process as defined in claim 23, wherein the additive is present in the ink composition at a mole fraction of from about 0.004 to about 0.04.

27. A process as defined in claim 23, wherein the additive has a dipole moment greater than about 10 debye.

28. A process as defined in claim 23, wherein the ink composition further comprises an organic cosolvent and a surfactant.

29. An ink composition comprising:
a dye;
a solvent for the dye; and
an additive comprising a sulfonic acid analog of an amino acid, the additive being present in the ink composition at a mole fraction of less than about 0.1, the additive having a polarity greater than the polarity of the solvent, the additive present in a concentration that prevents the dye from coalescing in the solvent thereby increasing the solubility of the dye in the solvent.

30. An ink composition as defined in claim 29, wherein the amino acid comprises glycine, lysine, taurine, beta-alanine, betaine, or mixtures thereof.

31. An ink composition as defined in claim 29, wherein the additive is present in the ink composition at a mole fraction of from about 0.004 to about 0.04.

32. An ink composition as defined in claim 29, wherein the additive has a dipole moment greater than about 4 debye.

33. An ink composition as defined in claim 29, wherein the additive has a dipole moment greater than about 10 debye.

34. An ink composition as defined in claim 29, wherein the dye comprises a sulfonated dye and the solvent comprises water.

* * * * *